(12) United States Patent
Uhler

(10) Patent No.: US 8,025,136 B2
(45) Date of Patent: Sep. 27, 2011

(54) TORQUE CONVERTER DAMPER FLANGE WITH TURBINE CENTERING FEATURE

(75) Inventor: Adam Uhler, Sterling, OH (US)

(73) Assignee: Schaeffler Technologies GmbH $ Co. KG, Herzogenaurach (DE)

( * ) Notice: Subject to any disclaimer, the term of this patent is extended or adjusted under 35 U.S.C. 154(b) by 598 days.

(21) Appl. No.: 11/980,930

(22) Filed: Oct. 31, 2007

(65) Prior Publication Data

US 2009/0045023 A1     Feb. 19, 2009

Related U.S. Application Data

(60) Provisional application No. 60/964,855, filed on Aug. 15, 2007.

(51) Int. Cl.
*F16H 45/02*     (2006.01)

(52) U.S. Cl. .................... 192/3.29; 192/55.61; 192/212
(58) Field of Classification Search ................ 192/3.3
See application file for complete search history.

(56) References Cited

U.S. PATENT DOCUMENTS

| 5,385,222 | A | 1/1995 | Dieter et al. | |
| 6,796,411 | B2 * | 9/2004 | Bauer et al. | 192/3.29 |
| 6,938,743 | B2 * | 9/2005 | Arhab et al. | 192/3.29 |

* cited by examiner

*Primary Examiner* — Rodney Bonck
(74) *Attorney, Agent, or Firm* — Davidson, Davidson & Kappel, LLC

(57) ABSTRACT

A torque converter including a turbine, an output shaft, and a damper having at least one cover plate radially fixed to the turbine, a flange driven by the damper and non-rotatably connected to the output shaft, the flange having an axially extending surface centering the cover plate.

8 Claims, 2 Drawing Sheets

TORQUE CONVERTER DAMPER FLANGE WITH TURBINE CENTERING FEATURE

Priority is claimed to U.S. Provisional Application Ser. No. 60/964,855, filed Aug. 15, 2007, which is incorporated by reference herein.

The present invention relates generally to hydraulic torque converters, and more particularly to hydraulic torque converters with lock-up clutches and dampers.

BACKGROUND OF THE INVENTION

In FIG. 1, a prior art torque converter 10 contains a cover 12, an impeller 14, a turbine 16, a stator 18, a lock-up clutch 20, and a damper 22. Torque converter 10 is driven by an engine connected with studs 24, 26. Impeller 14 is rigidly attached to cover 12. Turbine 16 is rigidly attached to a turbine hub 28 with, for example, rivets 30. Turbine hub 28 is non-rotatably attached to an output shaft 32 with, for example, spines 34. Turbine hub 28 centers turbine 16 around output shaft 32.

A piston 36 and a piston hub 38 of lock-up clutch 20 may move axially on an outer hub 40 of turbine hub 28 according to the controlled pressure difference between regions 42, 44 on either axial side of piston 36. When piston 36 is not contacting cover 12 at a surface 46, torque is transferred from the engine to output shaft 32 through the hydraulic fluid in torque converter 10. When piston 36 is contacting cover 12 at surface 46, torque is transferred from the engine to output shaft 32 through springs 48 in damper 22. U.S. Pat. No. 5,385,222 is hereby incorporated by reference herein.

SUMMARY OF THE INVENTION

The present invention provides a torque converter comprising a turbine, an output shaft, and a damper having at least one cover plate radially fixed to the turbine, and a flange driven by the damper and non-rotatably connected to the output shaft, the flange having an axially extending surface centering the cover plate.

The present invention advantageously permits the turbine to be centered using the flange.

Figure 2:
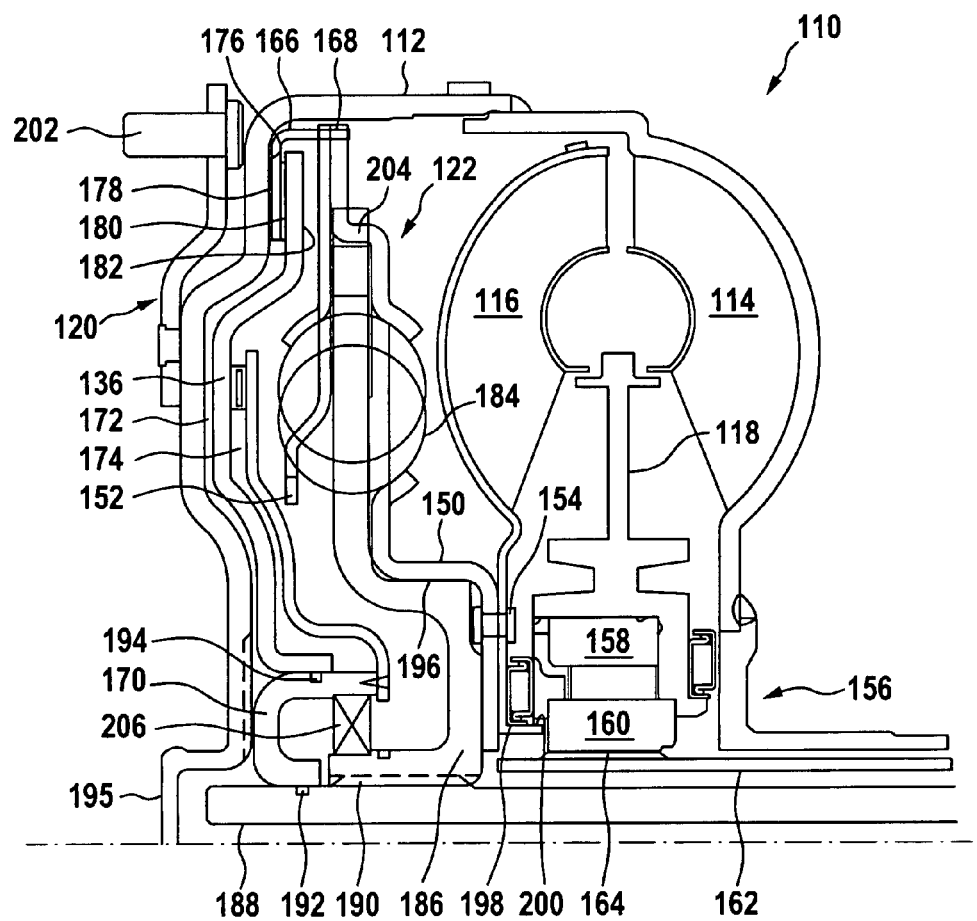

One embodiment of the present invention is shown with respect to the drawings in which:

FIG. 2 shows one embodiment of a torque converter according to the present invention.

DETAILED DESCRIPTION

FIG. 2 describes a torque converter 110 according to the present invention, having a cover 112, an impeller 114, a turbine 116, a stator 118, a lock-up clutch 120, and a damper 122. Impeller 114 is rigidly attached to cover 112. Turbine 116 is rigidly attached to cover plate 150 with, for example, rivets 154. Stator 118 is mounted on a one-way clutch 156 with an outer race 158 and an inner race 160 non-rotatably attached to a stator shaft 162 with, for example, spines 164.

Lock-up clutch 120 includes a piston 136, a clutch plate 166, and cover plates 150, 152. Cover plates 150, 152 are non-rotatably connected to clutch plate 166 with, for example, spines 168. Piston 136 may move axially on a cover flange 170 according to a controlled pressure difference between regions 172, 174 on either axial side of piston 136. Lock-up clutch 120 is open when piston 136 is positioned axially towards the turbine 116. Lock-up clutch 120 is closed when piston 136 is positioned axially towards engine to engage friction surfaces 176, 178, 180, 182 on clutch plate 166, cover 112, and piston 136.

Damper 122 includes cover plates 150, 152 retaining an annular arrangement of springs 184. Springs 184 contact a flange 186 non-rotatably connected to an output shaft 188 with, for example, spines 190. Output shaft 188 can be the input shaft of a transmission, for example.

Cover flange 170 is attached rigidly to cover 112. Adjacent to cover flange 170 are seals 192, 194 to seal output shaft 188 and piston 136. Cover 112 is centered in an engine crankshaft with a cover pilot 195 extended from cover 112. Cover flange 170 is centered by cover 112. Flange 186 is centered in cover flange 170 with a bearing 206. Cover plate 150 and turbine 116 are centered on flange 186 at an axially extending surface 196. Output shaft 188 is centered in flange 186. A thrust bearing 198 is centered in turbine 116 at a tubular surface 200.

Engine torque enters the torque converter 110 through a stud 202. Torque from stud 202 is transmitted to cover 112. Torque from cover 112 can be transmitted to either impeller 114 or clutch plate 166, depending on whether lock-up clutch 120 is open or closed.

When lock-up clutch 120 is open, torque from cover 112 is transmitted to impeller 114. Impeller 114 transmits torque to turbine 116 through the oil in torque converter 110. Turbine 116 transmits torque to cover plate 150. Cover plate 150 transmits torque into flange 186 through springs 184. If the torque exceeds the capacity of springs 184, flange 186 will directly contact cover plate 150 at area 204. Flange 186 directly transmits torque into output shaft 188. Flange 186 transmits axial thrust from turbine 116 to bearing 206 supported on cover flange 192. Flange 186 has a U-shaped section with one leg having axially extending surface 196 and the other having spines for interacting with spines 190.

When lock-up clutch 120 is closed, torque from cover 112 is transmitted to clutch plate 166. Clutch plate 166 transmits torque into cover plate 150. Cover plate 150 has additional inertia of turbine 116. Cover plate 150 transmits torque into flange 186 through springs 184. If torque exceeds the capacity of springs 184, flange 186 will directly contact cover plate 150 at area 204. Flange 186 directly transmits torque into output shaft 188.

Figure 1:
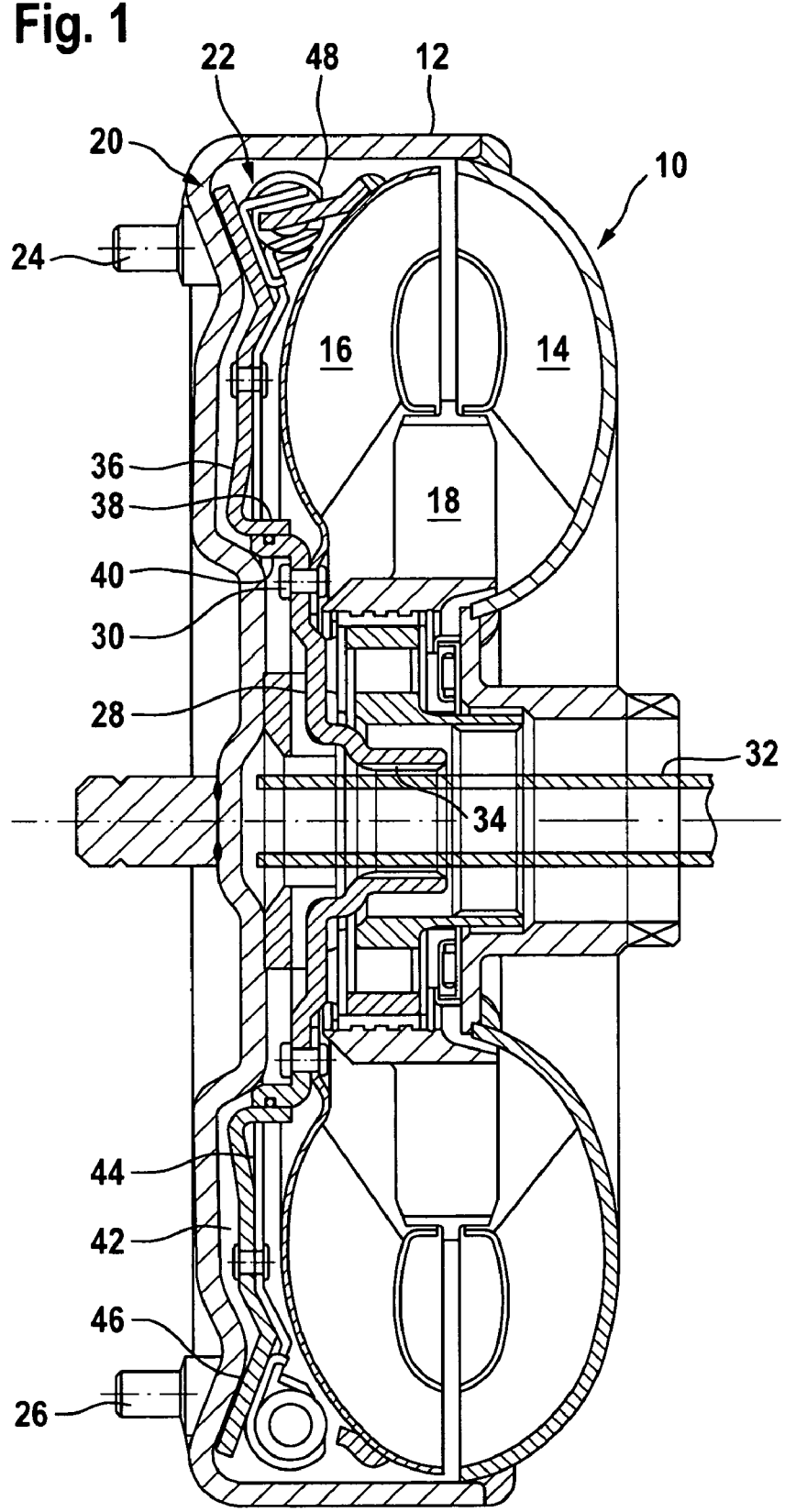
FIG. 1 shows a prior art torque converter.

By mounting flange 186 on output shaft 188 and contacting flange 186 to springs 184 in damper 122, the use of hubs 38, 40 in the prior art shown in FIG. 1 is advantageously avoided without adding additional pieces. Providing flange 186 with axially extending surface 196 advantageously centers cover plate 150 and turbine 116 on flange 186 and centers output shaft 188. Design of the torque converter is thus simplified and cost is reduced.

What is claimed is:

1. A torque converter comprising:
   a turbine;
   an output shaft; and
   a damper having at least one cover plate radially fixed to the turbine;
   a flange driven by the damper and non-rotatably connected to the output shaft, the flange having an axially extending surface centering the cover plate, wherein the flange has a U-shaped section, one leg of the U-shaped section having the axially extending surface, and the other leg having splines for connection to the output shaft, wherein the cover plate and the turbine are centered on the flange at the axially extending surface, the cover plate having a complimentary bended surface with the flange and a radially inner portion extending below the axially extending surface in a radial direction.

2. The torque converter as recited in claim 1 further comprising a cover and an impeller, the impeller driving the turbine and connected to the cover.

3. The torque converter as recited in claim 2 further comprising a cover flange radially fixed to the cover, the cover flange being centered by the cover and the turbine and output shaft being centered by the flange.

4. The torque converter as recited in claim 3 further comprising a bearing located between the flange and the cover flange.

5. The torque converter as recited in claim 3 wherein the cover flange is U-shaped.

6. The torque converter as recited in claim 3 further comprising lock-up clutch having a piston connected to the cover flange.

7. The torque converter as recited in claim 1 wherein the at least one cover plate includes the cover plate and a second cover plate.

8. The torque converter as recited in claim 1 wherein the damper includes springs.

* * * * *